United States Patent
Heilmann et al.

(10) Patent No.: US 8,803,726 B2
(45) Date of Patent: Aug. 12, 2014

(54) METHOD FOR DETECTING ICING AT AN ANGLE-RESOLVING RADAR SENSOR IN A DRIVER ASSISTANCE SYSTEM FOR MOTOR VEHICLES

(75) Inventors: Stefan Heilmann, Vaihingen/Enz (DE); Volker Gross, Ditzingen (DE); Goetz Kuehnle, Hemmingen (DE); Dirk Bechler, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 532 days.

(21) Appl. No.: 13/202,947

(22) PCT Filed: Dec. 28, 2009

(86) PCT No.: PCT/EP2009/067940
§ 371 (c)(1), (2), (4) Date: Nov. 4, 2011

(87) PCT Pub. No.: WO2010/097136
PCT Pub. Date: Sep. 2, 2010

(65) Prior Publication Data
US 2012/0049860 A1    Mar. 1, 2012

(30) Foreign Application Priority Data
Feb. 27, 2009   (DE) .......................... 10 2009 001 243

(51) Int. Cl.
*G01S 13/95*  (2006.01)
*G01S 13/56*  (2006.01)
*G01S 7/41*   (2006.01)

(52) U.S. Cl.
CPC .............. *G01S 13/951* (2013.01); *G01S 13/56* (2013.01); *G01S 7/412* (2013.01)
USPC ............. 342/26 R; 342/26 D; 342/70; 342/27

(58) Field of Classification Search
CPC ....... G01S 13/951; G01S 13/56; G01S 7/411; G01S 7/412; G01S 13/04; G01S 7/414; G01S 13/95; G01S 2013/9392; G01W 1/02
USPC ....... 342/26 R, 26 D, 27, 70–72, 90; 340/580
See application file for complete search history.

(56) References Cited

U.S. PATENT DOCUMENTS 5,592,170 A * 1/1997 Price et al. .................... 342/22
6,621,448 B1 * 9/2003 Lasky et al. ................... 342/22

(Continued)

FOREIGN PATENT DOCUMENTS

DE   19945268   3/2001
DE   19948253   5/2001

(Continued)

OTHER PUBLICATIONS

International Search Report, PCT International Patent Application No. PCT/EP2009/067940 dated Apr. 20, 2010.

*Primary Examiner* — John B Sotomayor
(74) *Attorney, Agent, or Firm* — Kenyon & Kenyon LLP

(57) ABSTRACT

A method for detecting icing at an angle-resolving radar sensor in a driver assistance system for motor vehicles, in which signals of a plurality of antenna elements each having a specific angle characteristic are compared with the corresponding angle characteristics, and the azimuth angle of a located object is determined on the basis of an angle fit quality which indicates how well the signals of the antenna elements correspond to the angle characteristics for a given azimuth angle, wherein an indicator for icing is formed which is a monotonically falling function of the angle fit qualities of the located objects, with objects having a low signal-to-noise ratio being included in the indicator at the most with a reduced weighting.

10 Claims, 3 Drawing Sheets

(56) References Cited

U.S. PATENT DOCUMENTS

| | | | |
|---|---|---|---|
| 6,691,003 B1 | 2/2004 | Stortz et al. | |
| 7,911,324 B2 * | 3/2011 | Breed et al. | 340/10.1 |
| 2007/0013576 A1 | 1/2007 | Shingyoji et al. | |
| 2008/0129541 A1 * | 6/2008 | Lu et al. | 340/905 |
| 2013/0035901 A1 * | 2/2013 | Breed | 702/188 |

FOREIGN PATENT DOCUMENTS

| | | |
|---|---|---|
| DE | 102005031921 | 2/2006 |
| EP | 2000826 | 12/2008 |

* cited by examiner

METHOD FOR DETECTING ICING AT AN ANGLE-RESOLVING RADAR SENSOR IN A DRIVER ASSISTANCE SYSTEM FOR MOTOR VEHICLES

FIELD OF THE INVENTION

The present invention relates to a method for detecting icing at an angle-resolving radar sensor in a driver assistance system for motor vehicles, in which signals from a plurality of antenna elements each having a specific angle characteristic are compared with the corresponding angle characteristics, and the azimuth angle of a located object is determined on the basis of an angle fit quality which indicates how well the signals of the antenna elements correspond to the angle characteristics for a given azimuth angle.

BACKGROUND INFORMATION

Motor vehicles are increasingly being fitted with driver assistance systems, for example with so-called ACC (adaptive cruise control) systems, which allow the distance of the driver's own vehicle from a vehicle in front to be automatically regulated. To that end, the distances and azimuth angles and also the relative speeds of vehicles travelling in front are measured with the aid of the radar sensor, for example an FMCW-LRR (frequency modulated wave long range radar) sensor.

The radar sensors used hitherto in that connection have, for example, four antenna elements or antenna patches which are arranged horizontally offset from the optical axis of the radar sensor in front of a radar lens.

In a first evaluation stage, each antenna element is allocated exactly one channel in which the signal received by the relevant antenna element is evaluated. For example, in the case of an FMCW radar in which the frequency of the transmitted radar signal is modulated periodically, for each antenna element the received signal is mixed with the signal transmitted at the time of reception, so that an intermediate frequency signal is obtained whose frequency corresponds to the frequency difference between the transmitted signal and the received signal. In the relevant channel of the evaluation device, a frequency spectrum of the intermediate frequency signal is then recorded in each measuring cycle. In that frequency spectrum, each located object shows as a peak whose frequency is dependent upon the distance and relative speed of the object concerned. By modulation of the transmitted frequency using different ramp slopes, it is possible for the distance and the relative speed to be calculated from the frequencies obtained.

Each antenna element radiates the radar output into a certain solid angle region at an intensity that varies as a function of the azimuth angle. The amplitude and phase of the signal received is dependent upon the azimuth angle of the located object. That dependency, the so-called angle characteristic, may be represented for a standard object at a given distance and with a given reflective power in an antenna diagram. By reconciling the amplitudes and/or phases obtained by the various antenna elements for the same object with the corresponding antenna diagrams, it is then possible to determine the azimuth angle of the object concerned.

The antenna elements are mounted behind a radar lens or some other covering, a so-called radome, and are therefore protected against effects of the weather. A film of water or a coating of dirt on the lens or radome may, however, cause the radar radiation to be attenuated to such a great extent that the object peaks no longer have a sufficient signal-to-noise ratio and therefore reliable object detection is no longer possible. This is referred to as "blinding" of the radar sensor. Since the driver of the vehicle normally relies on the functional capability of the driver assistance system, it is important for safety reasons that any impairment of operation or blinding of the radar sensor during operation may be detected without delay.

German Patent Application 199 45 268 A1 describes a method for detecting blindness, in which there is used as a blindness indicator inter alia the average angle quality of all detected objects. The term "angle quality" refers in that case to the quotient of the real object angle and the difference between the real and the measured object angle. If the angle quality averaged over a plurality of objects points to a poor quality of the angle detection, that is taken as an indication of possible soiling or blinding of the radar sensor.

With that conventional method, it is not possible, however, to detect a layer of ice on the radar lens or radome, since a layer of ice generally does not lead to significant attenuation of the radar signal.

However, since such a layer of ice has a refractive index that is different from the refractive index of air, it may lead, similarly to the radar lens itself, to a refraction and hence to a change in the direction of the radar radiation, with the result that, although objects may still be detected, the determination of their azimuth angle is falsified. That situation will be referred to hereinafter as "angle blindness".

SUMMARY

An object of the present invention is to provide a method that permits impairment of the operation of the driver assistance system due to angle blindness to be reliably detected.

In accordance with an example embodiment of the present invention, the object may be attained by forming an icing indicator which is a monotonically falling function of the angle fit qualities of the located objects, with objects having a low signal-to-noise ratio being included in the indicator at most with a reduced weighting.

The indicator formed by the example method according to the present invention makes it possible for icing of the radar sensor, that is, a layer of ice on the radar lens or the radome, which causes angle blindness, to be inferred even when the radar sensor is not blinded as a result of a layer of dirt or other causes. The example method thus permits the detection specifically of situations in which the functional capability of the driver assistance system is being impaired by angle blindness, and enables suitable warning measures or counter-measures to be instituted, for example a warning to the driver, self-deactivation of the system, or transfer to an operating mode that is less demanding of the angle resolution capacity. Since the situation detected by the example method according to the present invention points specifically to a layer of ice on the lens or radome, the counter-measure may also take the form of the ice layer being melted by heating of the radome and/or of the ice layer being blasted off by vibration.

The angle fit qualities which are evaluated in the example method according to the present invention may be determined without it being necessary for the real azimuth angle of the object to be known. In the case of objects whose peak has only a very low signal-to-noise ratio, however, a low angle fit quality is generally to be expected, even if there is no icing. For that reason, in the example method according to the present invention, such objects are suppressed or at least are taken into consideration with a reduced weighting. The example method is thus based primarily on the evaluation of the angle fit qualities of objects having a high signal-to-noise ratio, the existence of such objects implying at the same time that there is no general blinding of the radar sensor, or in any event no complete blinding.

In accordance with an advantageous embodiment, the objects whose angle fit quality is included in the indicator are selected not only on the basis of their signal-to-noise ratio but also on the basis of a uniqueness criterion which indicates that the signal being evaluated in respect of angle fit quality does in fact originate only from a single object and does not result from an overlapping of the signals of a plurality of objects. Signal peaks resulting from an overlapping of signals of objects having different azimuth angles naturally lead to a poor angle fit quality and could, therefore, if they were not suppressed, simulate icing.

BRIEF DESCRIPTION OF THE DRAWINGS

An exemplary embodiment of the present invention is illustrated in the figures and is described in detail below.

DETAILED DESCRIPTION OF THE EXAMPLE EMBODIMENTS

Figure 1:
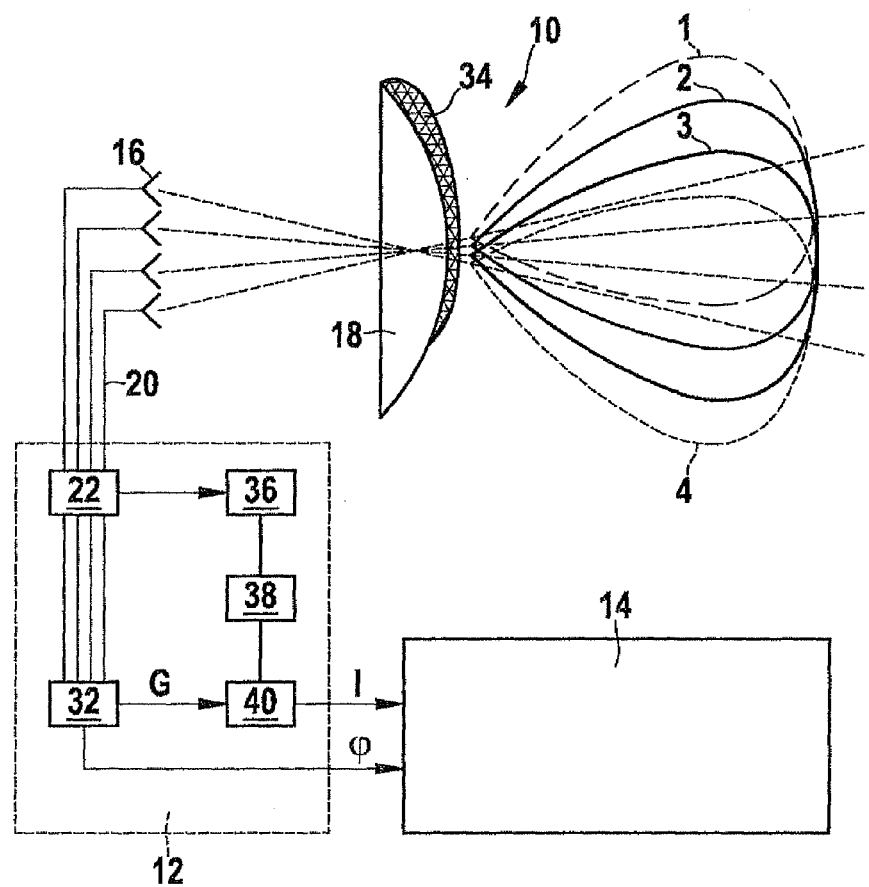
FIG. 1 is a block diagram of a radar sensor with which the example method according to the present invention may be carried out.

The driver assistance system shown in FIG. 1, for example an ACC system, includes a radar sensor 10, of which only the main components that are used in connection with the present invention are illustrated, a first evaluation stage 12 and a second evaluation stage 14.

Radar sensor 10 has four antenna elements 16, which are disposed in front of a common lens 18. When radar sensor 10 is installed in a motor vehicle, not shown, the optical axis of lens 18 points, for example, in the longitudinal direction of the vehicle, and antenna elements 16 are disposed in laterally offset relationship to one another on a horizontal line. The emitted radar radiation is concentrated by lens 18, and the received radar echoes are again focused onto antenna elements 16. The angular distribution of the emitted radiation and the sensitivity are symbolized in FIG. 1 by radar lobes 1-4, one lobe for each antenna element. Owing to the offset relationship of the antenna elements, the axes of the individual radar lobes, shown by dashed lines in FIG. 1, are offset from one another in the azimuth by a given angle, for example by 4°.

The output of radar sensor 10 has four channels 20 each associated with a respective antenna element 16.

As an example, it will be assumed that radar sensor 10 is an FMCW radar. The radar signals transmitted from antenna elements 16 are then modulated in the shape of a ramp, for example with alternately rising and falling frequency ramps. The radar echoes received are each mixed with a portion of the signal transmitted at the time of reception, so that there is obtained on each channel 20 an intermediate frequency signal whose frequency is dependent upon the distance and relative speed of the located object.

First evaluation stage 12 includes an identification module 22 in which, for each of channels 20 and for each frequency ramp, the intermediate frequency signal is sampled and is converted by rapid Fourier transformation into a spectrum.

Figure 2:
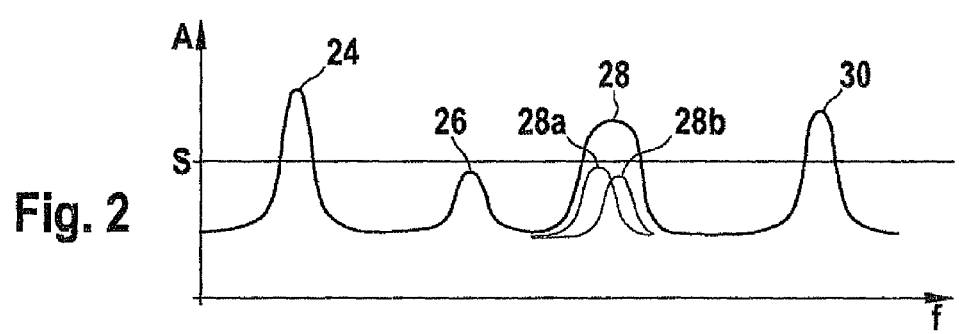
FIG. 2 shows a spectrum of a signal received by an antenna element of the radar sensor shown in FIG. 1.

An example of such a spectrum is shown in FIG. 2. In that spectrum, each located object shows as a peak 24, 26, 28, 30, i.e., a local maximum of the amplitude A at a specific frequency f. The frequency at which the apex of the peak is situated defines a linear relationship between the distance and relative speed of the located object, which relationship is dependent upon the respective ramp slope.

In a distance/speed diagram, that relationship may be represented by a straight line. Thus, in a plurality of successive modulation ramps that differ in their slope, different peaks and correspondingly different straight lines, which differ in their slope, are obtained for the same object.

If the peaks really belong to the same object, all of those straight lines should, however, intersect in a point. In that manner it is possible (with three or more different ramp slopes) to obtain a clear correlation between peaks and objects. That enables identification module 22 to clearly identify each peak with an associated object.

First evaluation stage 12 further has an angle detection module 32 which serves to determine for each object the azimuth angle at which it is "seen" by radar sensor 10. This makes use of the fact that the amplitude A and the phase (i.e. the complex amplitude) of the received signal and also of the intermediate frequency signal is dependent in a specific manner upon the azimuth angle of the object. That dependency is described by an angle characteristic which may be represented in an antenna diagram. For each of antenna elements 16, the angle characteristic is measured using an ideal object and is stored in digital form in second evaluation stage 14.

Figure 3:
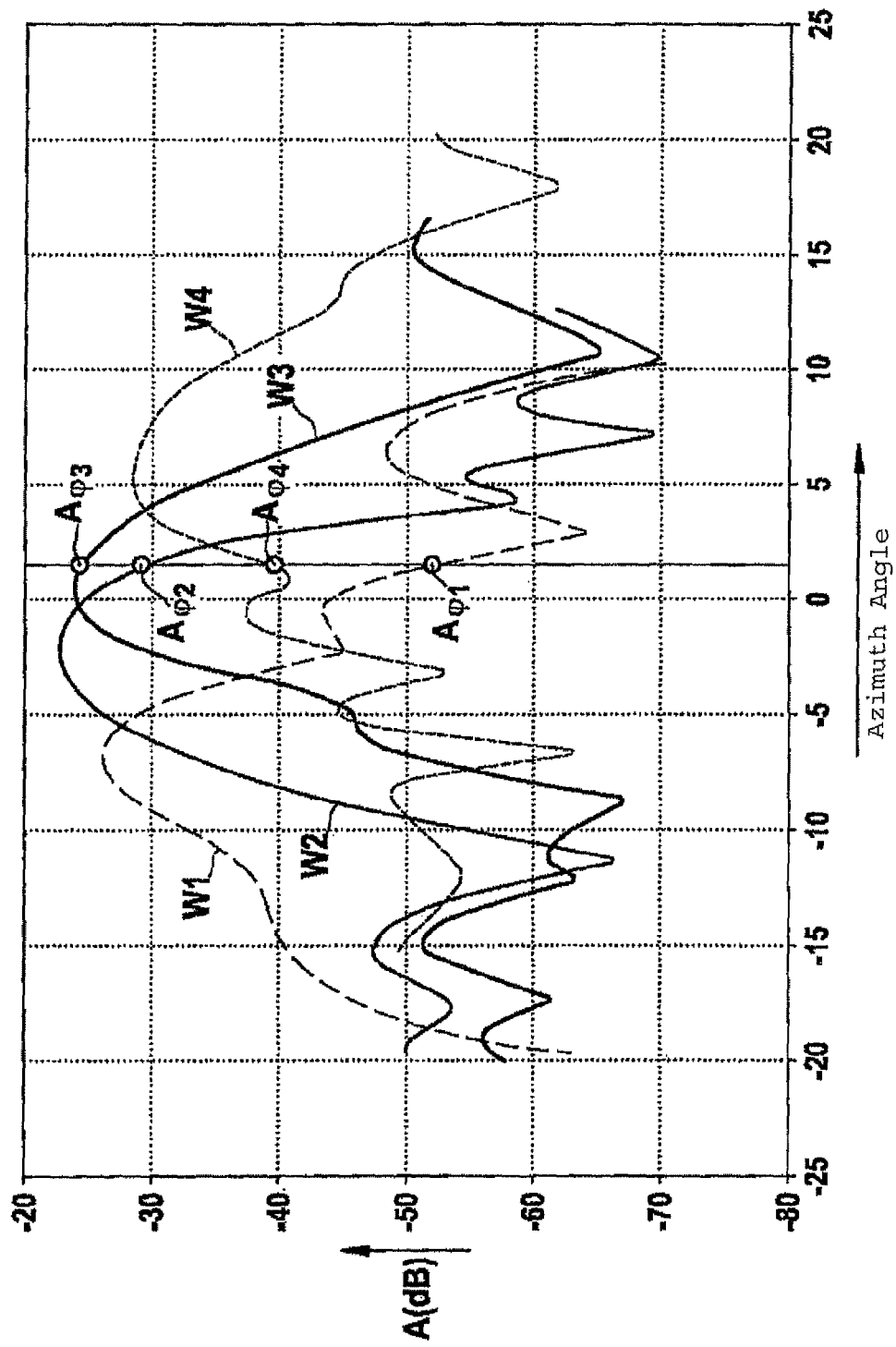
FIG. 3 is a diagram with (amplitude) angle characteristics of the antenna elements of the radar sensor shown in FIG. 1.

FIG. 3 shows, as an example, an antenna diagram with angle characteristics of the four antenna elements 16 in FIG. 1. The angle characteristics are denoted by W1-W4 in FIG. 3, the numbering and type of line representation corresponding to that of radar lobes 1 to 4 in FIG. 1.

If, then, an ideal object is at a specific azimuth angle, and in the example shown in FIG. 3 at the azimuth angle of 1.5°, the antenna diagram shows the amplitudes $A_{\phi 1}$-$A_{\phi 4}$ that are to be expected on the corresponding channels 20. The amplitudes A (only the absolute values of the complex amplitudes are shown graphically here) each represent the maxima of the peaks belonging to the object. Ideally, therefore, the azimuth angle of the object may be determined by locating in the antenna diagram the angle at which all four measured amplitudes correspond to the associated angle characteristics. The locating of that angle is referred to as the "angle fit".

According to that principle, angle detection module 32 in FIG. 1 should be capable of providing, for each located object, an associated azimuth angle $\phi$ which may then be further evaluated in second evaluation stage 14. Each object is in that case represented by a pair formed by distance and relative speed, which pair was identified with the relevant object by identification module 22. In second evaluation stage 14 of the driver assistance system, those location data, i.e. the distances, relative speeds and azimuth angles of the located objects, are further evaluated and are used, for example, for automatic distance control. The azimuth angles of the objects are then significant primarily in deciding which of the located objects is in the lane in which the driver's own vehicle is travelling and should therefore be selected as the target object for the distance control.

Figure 4:
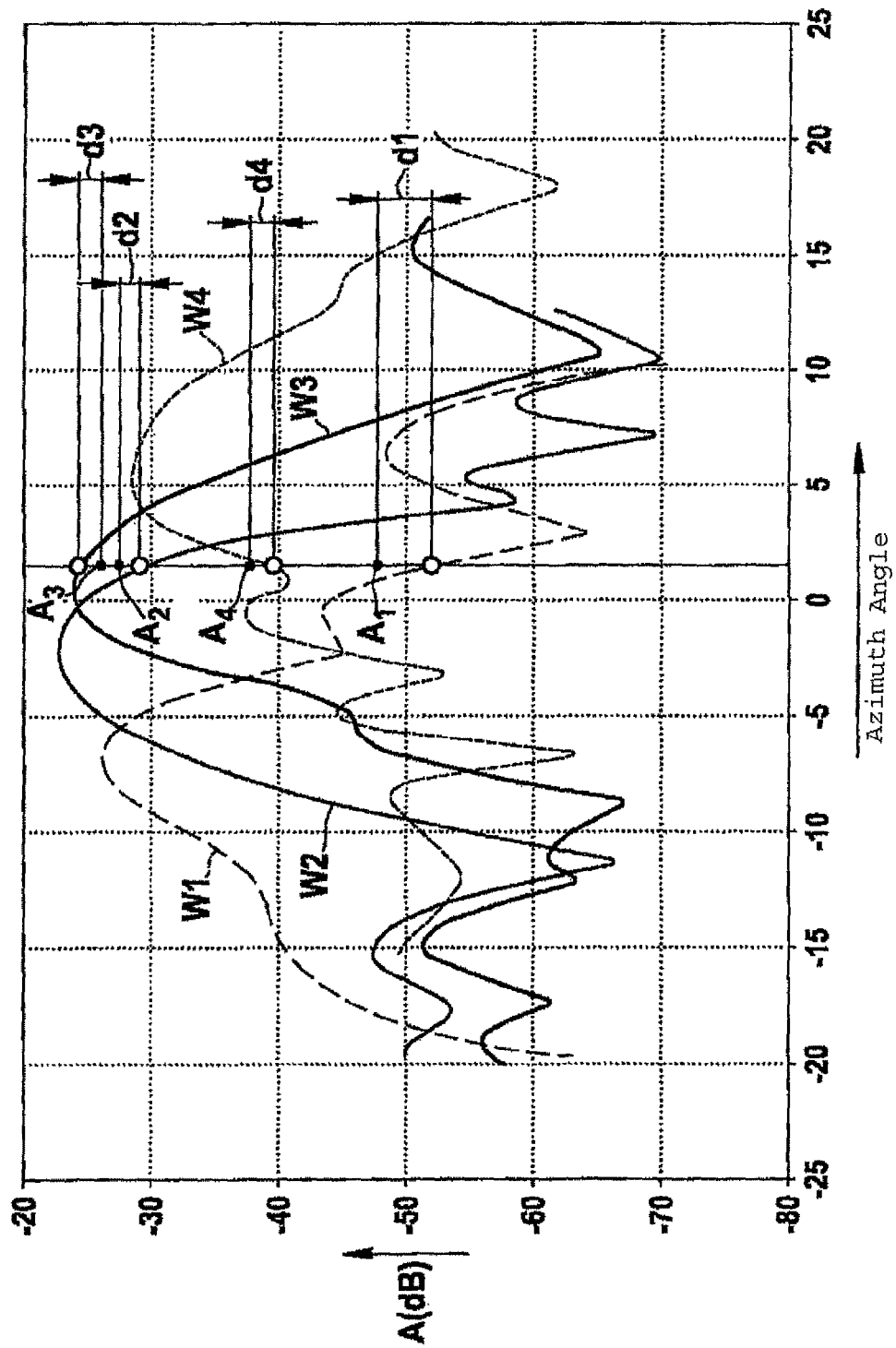
FIG. 4 shows an example of an angle fit on the basis of the diagram shown in FIG. 3.

In practice, however, various interfering effects result in the angle fit usually not turning out as well as that illustrated in idealized form in FIG. 3. A realistic scenario is shown in FIG. 4, where the amplitudes obtained in the four channels 20 for a real object are marked by black dots at the azimuth angle of 1.5° and are denoted by $A_1$-$A_4$. It will be seen that those amplitudes deviate to a greater or lesser extent from the associated ideal amplitudes which are marked in FIG. 4, as in FIG. 3, by white dots. The differences between the measured amplitudes $A_1$-$A_4$ and the associated ideal amplitudes are denoted by d1-d4 in FIG. 4.

There is no azimuth angle at which the measured amplitudes $A_1$-$A_4$ would all correspond to the respectively associated angle characteristics W1-W4. The angle of 1.5° at which the measurement points in FIG. 4 are plotted represents the angle at which the correspondence is still best. The term "best" may be precisely expressed mathematically, for example by definition of a correlation Q:

$$Q(\phi):=|\Sigma S_k^* \cdot A_k(\phi)|/(\Sigma |S_k|^2 \cdot \Sigma |A_k(\phi)|^2)^{1/2}; k=1,2,3,4$$

where:
$A_k$: complex antenna diagram of beam k
$S_k$: complex received signal in beam k The azimuth angle of the object will then be the angle $\phi$ at which $Q(\phi)$ is at a maximum, and the corresponding maximum value of $Q(\phi)$ is then the angle fit quality G. That angle fit quality is standardized to the interval [0,1], so that the value G=1 corresponds to an ideal angle fit and G=0 corresponds to an extremely poor angle fit.

Angle detection module 32 in FIG. 1 thus provides for each located object not only the azimuth angle $\phi$ but also the associated angle fit quality G. An angle fit quality of G=1 would correspond to an ideal angle fit (as in FIG. 3), and the smaller the value of G, the poorer is the angle fit quality and, accordingly, the more unreliable is the associated azimuth angle.

When radar sensor 10 is iced up, i.e., when a layer of ice 34 has formed on the surface of lens 18 or a portion thereof, as illustrated schematically in FIG. 1, the radar radiation is additionally refracted by that layer of ice and radar lobes 1 to 4 are correspondingly distorted. The result is a corresponding distortion and shifting of angle characteristics W1-W4, with the result that the measured azimuth angles $\phi$ may be affected by a systematic error that may possibly provoke erroneous reactions of the driver assistance system.

The distortion of the angle characteristics caused by ice crust 34 not only leads to a systematic error, however, but also tends to lead to a deterioration in the angle fit quality G. For that reason, in the case of the example method described herein the angle fit quality G is systematically examined to ascertain whether it indicates icing of the radar sensor and hence angle blindness, i.e., a falsification of the angle location data.

It is necessary to take into account here, however, that a poor angle fit quality G may also have other causes. In particular, objects having a low signal-to-noise ratio generally also have a poorer angle fit quality. Such objects should therefore be excluded in the detection of icing or angle blindness.

As illustrated in FIG. 2, peaks 24-30 are at different heights above the general noise background, i.e., their maxima have differing signal-to-noise ratios. Associated with identification module 22 in FIG. 1 there is a discrimination module 36 which discriminates (excludes) those objects whose peaks have a signal-to-noise ratio below a given threshold value S, as is the case, for example, with peak 26 in FIG. 2.

In general, it is necessary to take into account here that for each object, four peaks are usually obtained, one on each of the four channels 20, and that those peaks may differ in their height. Discrimination module 36 may be configured in such a manner that it finds the average signal-to-noise ratio of those four peaks or evaluates each object on the basis of the peak having the best signal-to-noise ratio.

For detecting angle blindness, then, only those objects that have a sufficiently high signal-to-noise ratio are selected, such as, for example, the objects belonging to peaks 24 and 30 in FIG. 2. Threshold value S is chosen in that case to be such that normally a very high angle fit quality (G close to 1) would also be to be expected for objects exceeding that threshold value.

In the example embodiment described herein, before the peaks or objects are used for detecting angle blindness, they are also examined in a uniqueness module 38 to ascertain whether the peaks concerned meet the condition that they actually originate from a single object that is characterized by a unique azimuth angle.

In FIG. 2, peak 28 shows an example of a peak that, although above threshold value S, does not meet the condition tested in uniqueness module 38. That peak represents in reality not a single object, but two objects whose peaks 28a and 28b happen to overlap so that they appear as a single peak 28. Since the azimuth angles of those objects will generally be different, it would be possible at most to obtain an angle fit of high angle fit quality for individual peaks 28a and 28b (which in practice are not detectable), but not for peak 28 produced as a result of overlapping. That peak also, therefore, should remain unconsidered in the detection of angle blindness.

Overlapping of two individual peaks having differing azimuth angles may occur, for example, when two located vehicles (with differing azimuth angles) have differing relative speeds and, in addition, also happen to differ in their distances in such a manner that the frequency difference due to the Doppler effect and the differing relative speeds is cancelled out again.

Such situations may be detected, for example, by tracking the located objects over a longer period, i.e., over several measuring cycles of radar sensor 10, in second evaluation stage 14. Since, according to the above assumption, the two objects whose peaks overlap will have differing relative speeds, their distances will change in the course of time, and therefore the overlapping may only be a one-time phenomenon that occurs at a specific point in time. If the history of the objects has been tracked, it is possible, therefore, to recognize the overlapping for what it is.

A further possibility for detecting such peak overlapping is provided by analysis of the speed/distance diagrams, which were discussed in connection with identification module 22. The effect that the distance of an object has on the frequency of the peak is proportional to the slope of the modulation ramp, whereas the effect of the relative speed is independent of the ramp slope. If two peaks overlap on one modulation ramp, therefore, they will not often overlap on another modulation ramp, and in that manner it is possible to establish that, in reality, two different objects are involved to which it is not possible as a rule to assign a unique azimuth angle.

Yet another possibility for detecting peak overlapping is provided by the fact that a peak that originates from an ideal individual object will have a specific and known shape in its apex region (the Fourier transform of the sample window), so that uniqueness module 38 is able to detect peak overlapping if the shape of the peak deviates significantly from the expected shape.

Overlapping of peaks with a non-unique azimuth angle may also occur, for example, when the radar echo of a distant object is reflected at the left and right guardrails of the roadway before it reaches radar sensor 10 again. The distances and relative speeds are then almost identical, since both part-beams originate, of course, from the same object but, owing to reflection at different guardrails, the azimuth angles are different. Such cases, and also the cases of peak overlapping described earlier, may be detected by closer analysis of the angle fit quality.

In the case of an individual object, the angle fit quality G typically reaches a maximum at a very specific azimuth angle (at 1.5° in FIGS. 3 and 4) and moves further away from that maximum the further away the observed angle is from the actual azimuth angle of the object. This means that, when one plots the angle fit quality for a given peak as a function of the azimuth angle $\phi$, one obtains a function with a unique maximum at a specific azimuth angle, namely at the true azimuth angle of the associated object. If, on the other hand, the peak represents an overlapping of reflections with different azimuth angles, the function indicating the angle fit quality as a function of the azimuth angle will as a rule have two separate maxima. In an embodiment in which angle detection module 32 performs such an analysis, peaks that, like peak 28, result from an overlapping of two individual peaks may therefore be discriminated in angle detection module 32.

For the detection of icing or angle blindness, first evaluation stage 12 in FIG. 1 has an average value module 40 which finds an average value from the angle fit qualities G provided by angle detection module 32, the average being taken, however, only over those objects that have not been discriminated by discrimination module 36 owing to their low signal-to-noise ratio and that have also not been detected as peak overlapping by uniqueness module 38 or by angle detection module 32 itself. The average value of the angle fit qualities G over the remaining objects (peaks 24 and 30 in FIG. 2) is then used to calculate an indicator I for angle blindness and hence also for icing. Since the angle blindness will be the greater, the poorer is the angle fit quality G, indicator I, which is passed to second evaluation stage 14, is defined as a monotonically falling function of G, for example I:=1−G.

Optionally, average value module 40 may also be so configured that, when finding the average value, it gives a greater weighting to objects having a high signal-to-noise ratio than to objects having a low signal-to-noise ratio. Discrimination module 36 could then be omitted or it could be integrated in average value module 40 by giving a weighting of zero to all objects for which the signal-to-noise ratio is smaller than S.

What is claimed is:

1. A method for detecting icing at an angle-resolving radar sensor in a driver assistance system for a motor vehicle, in which signals of a plurality of antenna elements each having a specific angle characteristic are compared with corresponding angle characteristics, and an azimuth angle of a located object is determined based on an angle fit quality which indicates how well the signals of the antenna elements correspond to angle characteristics for a given azimuth angle, the method comprising:
forming an indicator for icing which is a monotonically falling function of angle fit qualities of located objects, an object having a low signal-to-noise ratio being included in the indicator at most with a reduced weighting.

2. The method as recited in claim 1, wherein only objects whose signal-to-noise ratio is above a certain threshold value are included in the indicator.

3. The method as recited in claim 1, wherein the signals of the antenna elements are examined to ascertain whether the signals represent objects or ensembles of objects to which it is not possible to assign a unique azimuth angle, and such objects or ensembles remain unconsidered in the forming of the indicator.

4. The method as recited in claim 3, wherein peaks occurring in a spectra of the signals of the antenna elements are examined to ascertain whether the peaks have a shape that is characteristic of individual peaks.

5. The method as recited in claim 4, wherein the method is used for driver assistance systems having an FMCW radar as the radar sensor.

6. The method as recited in claim 4, wherein the spectra of the signals of the plurality of antenna elements are each examined for differing modulation ramps, and peaks in the spectra obtained for a plurality of modulation ramps are identified with objects on the basis of combinations of distances and relative speeds corresponding thereto, with overlapping of individual peaks being detected and eliminated in the forming of the indicator.

7. The method as recited in claim 6, wherein time progression of distances and relative speeds of the located objects is tracked and, situations in which signals of two or more objects are temporarily indistinguishable are detected, and the signals of those objects remain unconsidered in the forming of the indicator.

8. The method as recited in claim 7, wherein, for a located object, an angle fit quality for a plurality of possible azimuth angles of that object is determined and that object is considered in the forming of the indicator only if the angle fit quality as a function of the azimuth angle has a clear maximum.

9. A driver assistance system for motor vehicles, comprising:
an angle-resolving radar sensor; and
an evaluation system connected downstream of the radar sensor, the evaluation system configured for detecting icing at an angle-resolving radar sensor in the driver assistance system in which signals of a plurality of antenna elements each having a specific angle characteristic are compared with corresponding angle characteristics, and an azimuth angle of a located object is determined based on an angle fit quality which indicates how well the signals of the antenna elements correspond to angle characteristics for a given azimuth angle, the evaluation system configured to form an indicator for icing which is a monotonically falling function of angle fit qualities of located objects, an object having a low signal-to-noise ratio being included in the indicator at most with a reduced weighting.

10. A storage medium storing a computer code for driver assistance systems for motor vehicles having an angle-resolving radar sensor, the program code, when executed by a driver assistance system, causing the system to perform a method for detecting icing at an angle-resolving radar sensor in the driver assistance system, in which signals of a plurality of antenna elements each having a specific angle characteristic are compared with corresponding angle characteristics, and an azimuth angle of a located object is determined based on an angle fit quality which indicates how well the signals of the antenna elements correspond to angle characteristics for a given azimuth angle, the method comprising:
forming an indicator for icing which is a monotonically falling function of angle fit qualities of located objects, an object having a low signal-to-noise ratio being included in the indicator at most with a reduced weighting.

* * * * *